United States Patent
Allahdadian et al.

(10) Patent No.: US 12,020,131 B2
(45) Date of Patent: Jun. 25, 2024

(54) SPARSE ENSEMBLING OF UNSUPERVISED MODELS

(71) Applicant: Oracle International Corporation, Redwood Shores, CA (US)

(72) Inventors: Saeid Allahdadian, Vancouver (CA); Amin Suzani, Vancouver (CA); Milos Vasic, Zurich (CH); Matteo Casserini, Zurich (CH); Andrew Brownsword, Vancouver (CA); Felix Schmidt, Baden-Daettwil (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 751 days.

(21) Appl. No.: 17/221,212

(22) Filed: Apr. 2, 2021

(65) Prior Publication Data

US 2022/0318684 A1    Oct. 6, 2022

(51) Int. Cl.
| | |
|---|---|
| *G06N 20/20* | (2019.01) |
| *G06N 3/04* | (2023.01) |
| *G06N 3/0442* | (2023.01) |
| *G06N 3/045* | (2023.01) |
| *G06N 3/0495* | (2023.01) |
| *G06N 3/08* | (2023.01) |
| *G06N 3/088* | (2023.01) |
| *G06N 20/00* | (2019.01) |

(52) U.S. Cl.
CPC .............. *G06N 20/20* (2019.01); *G06N 3/04* (2013.01); *G06N 3/0495* (2023.01); *G06N 3/08* (2013.01); *G06N 3/088* (2013.01); *G06N 3/0442* (2023.01); *G06N 3/045* (2023.01); *G06N 20/00* (2019.01)

(58) Field of Classification Search
CPC ........ G06N 20/00; G06N 20/10; G06N 20/20; G06N 3/02; G06N 3/04; G06N 3/0442; G06N 3/045; G06N 3/0495; G06N 3/08; G06N 3/088
See application file for complete search history.

(56) References Cited

U.S. PATENT DOCUMENTS

| | | | |
|---|---|---|---|
| 2019/0324727 A1* | 10/2019 | Carranza | G06F 8/437 |
| 2020/0116522 A1* | 4/2020 | Paul | G01D 3/08 |

\* cited by examiner

*Primary Examiner* — Shane D Woolwine
(74) *Attorney, Agent, or Firm* — Hickman Becker Bingham Ledesma LLP

(57) ABSTRACT

Techniques are provided for sparse ensembling of unsupervised machine learning models. In an embodiment, the proposed architecture is composed of multiple unsupervised machine learning models that each produce a score as output and a gating network that analyzes the inputs and outputs of the unsupervised machine learning models to select an optimal ensemble of unsupervised machine learning models. The gating network is trained to choose a minimal number of the multiple unsupervised machine learning models whose scores are combined to create a final score that matches or closely resembles a final score that is computed using all the scores of the multiple unsupervised machine learning models.

20 Claims, 6 Drawing Sheets

SPARSE ENSEMBLING OF UNSUPERVISED MODELS

FIELD OF THE DISCLOSURE

This disclosure relates to unsupervised machine learning. Presented herein are techniques for optimal selection of unsupervised machine learning models to evaluate inputs using a gating network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Unsupervised learning is an important category of learning in artificial intelligence. Unlike supervised learning, in unsupervised learning there are no labels present for the data and therefore, the model learns patterns. There are many use cases of unsupervised learning algorithms such as creating language models, clustering, anomaly detection, etc.

Anomaly detection is an important tool with various use cases such as security, e.g. fraud detection and intrusion detection. A powerful tool recently employed in unsupervised anomaly detection is machine learning based models such as reconstructive neural networks. Anomaly detection using reconstructive neural networks can be categorized into two groups. In a first group, a whole dataset is used for training a model and the trained model is used to detect anomalies inside that dataset. In a second group, appropriate datasets are created for the model to be trained, fine-tuned, and tested over test dataset to make predictions on new data points (i.e. inference data).

Anomaly detectors can have different methodologies and architectures. These models and architectures perform at different levels of accuracy, recall and precision comparably for different datasets or even sub-datasets. Therefore, having several anomaly detectors trained and ensembling their results can create a better performance compared to each individual anomaly detector.

Ensembling anomaly detector models is typically performed using averaging of scores that are output by multiple models or choosing a maximum or minimum score of the multiple models as the final score. While maximizing or minimizing would make the final model the most conservative or unconservative, averaging creates a medium standpoint between the two extremes. These approaches can create good results while being simple and unbiased on the performance of each model.

However, using these approaches requires a large number of models. As the computing cost of executing each model used in an ensemble of models becomes expensive, the total computing cost of computing the scores from all of the anomaly detectors becomes extreme.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for sparse ensembling of unsupervised machine learning models. The proposed architecture is composed of multiple unsupervised machine learning models that each produce a score as output and a gating network that analyzes the inputs and outputs of the unsupervised machine learning models to select an optimal ensemble of unsupervised machine learning models.

During training, the gating network is trained to choose a minimal number of the multiple unsupervised machine learning models whose scores are combined to create a final score that matches or closely resembles a final score that is computed using all the scores of the multiple unsupervised machine learning models.

In each training iteration, the gating network receives a data sample as input and generates a vector of gate weights based on the respective data sample. Each value of the vector of gate weights corresponds to a distinct unsupervised machine learning model of the multiple unsupervised machine learning models. Gate weights are in the form of binary values, where a value of '1' indicates that the corresponding unsupervised machine learning model should be enabled for evaluating the input data sample and a value of '0' indicates that the corresponding unsupervised machine learning model should be disabled for evaluating the input data sample. A custom loss function is utilized by the gating network to calculate an error value that is backpropagated to the gating network to increase the prediction accuracy of the gating network.

During inference, a data sample is provided as input to the trained gating network. The trained gating network generates a vector of gate weights based on the input. The vector of gate weights selects a minimal number of the multiple unsupervised machine learning models whose scores are combined to create a final score that matches or closely resembles a final score that is computed using all the scores of the multiple unsupervised machine learning models.

These techniques provide an efficient selection of an ensemble of unsupervised machine learning models compared to previous techniques. The selected ensemble of unsupervised machine learning models provides a subset of unsupervised machine learning models from a larger set of unsupervised machine learning models that produces a final score that matches a final score that is computed using the full set of unsupervised machine learning models. Thus, such techniques provide the same results while conserving computing resources.

Example Computer

Figure 1:
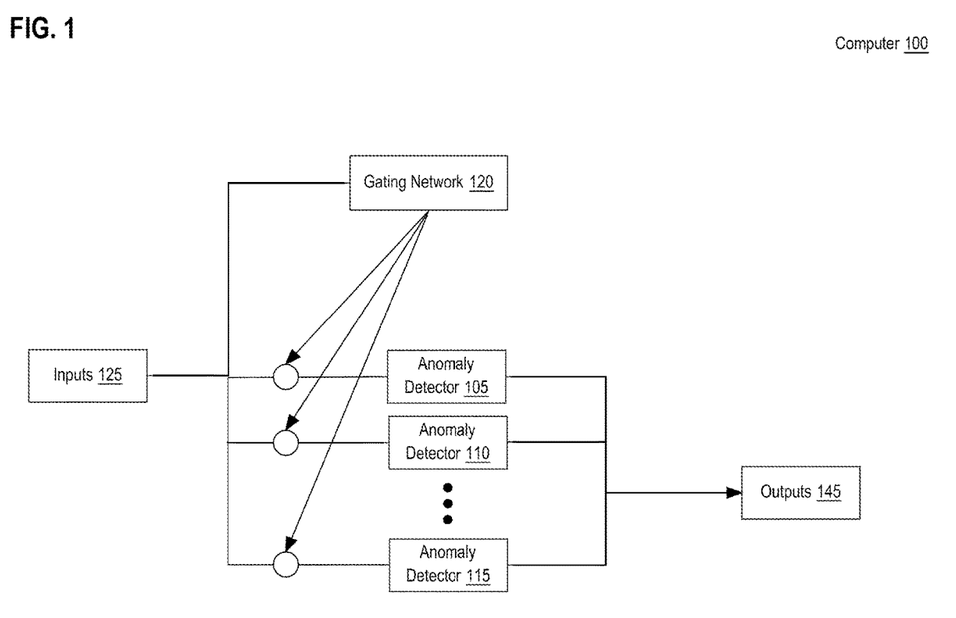
FIG. 1 is a block diagram that depicts an example computer for facilitating sparse ensembling of unsupervised machine learning models, in an embodiment.

FIG. 1 is a block diagram that depicts an example computer 100 for facilitating sparse ensembling of unsupervised machine learning models, in an embodiment.

Computer 100 may be one or more of a rack server such as a blade, a personal computer, a mainframe, a virtual computer, or other computing device.

Computer 100 hosts a plurality of trained machine learning models for anomaly detection including anomaly detector A 105, anomaly detector B 110 and anomaly detector N 115. For simplicity, only three anomaly detectors are depicted in FIG. 1, but N anomaly detectors may exist. Each of anomaly detector A 105, anomaly detector B 110 and anomaly detector N 115 accept inputs 125 and generates scores as outputs 145. Each score may indicate how anomalous the respective input is. In one embodiment, each of anomaly detector A 105, anomaly detector B 110 and anomaly detector N 115 comprises an unsupervised machine learning model, as defined in the section herein titled 'BACKPROPOGRATION'.

Computer 100 stores gating network 120 that comprises a trained machine learning model configured to accept inputs 125 and generate a vector of gate weights as output. In one embodiment, gating network 120 comprises a feed-forward neural network. In one embodiment, each gate weight comprises a binary value. Each gate weight of the vector corresponds to a distinct anomaly detector of anomaly detectors 105, 110, N. For example, if there are 10 anomaly detectors, gating network 120 generates a vector of size 10 that includes one gate weight for each of the 10 anomaly detectors.

The vector of gate weights generated by the gating network 120 is used to select a subset of anomaly detectors for evaluating a particular input that is used by the gating network 120 to generate the vector of gate weights. For example, if a particular input is used by gating network 120 to generate a vector of gate weights that includes the values {1, 1, 0}, the anomaly detectors that correspond to the gate weights of the vector that are set to '1' are selected to evaluate the particular input. In one embodiment, gating network 120 comprises a neural network and is trained using techniques further discussed herein.

Training

Figure 2:
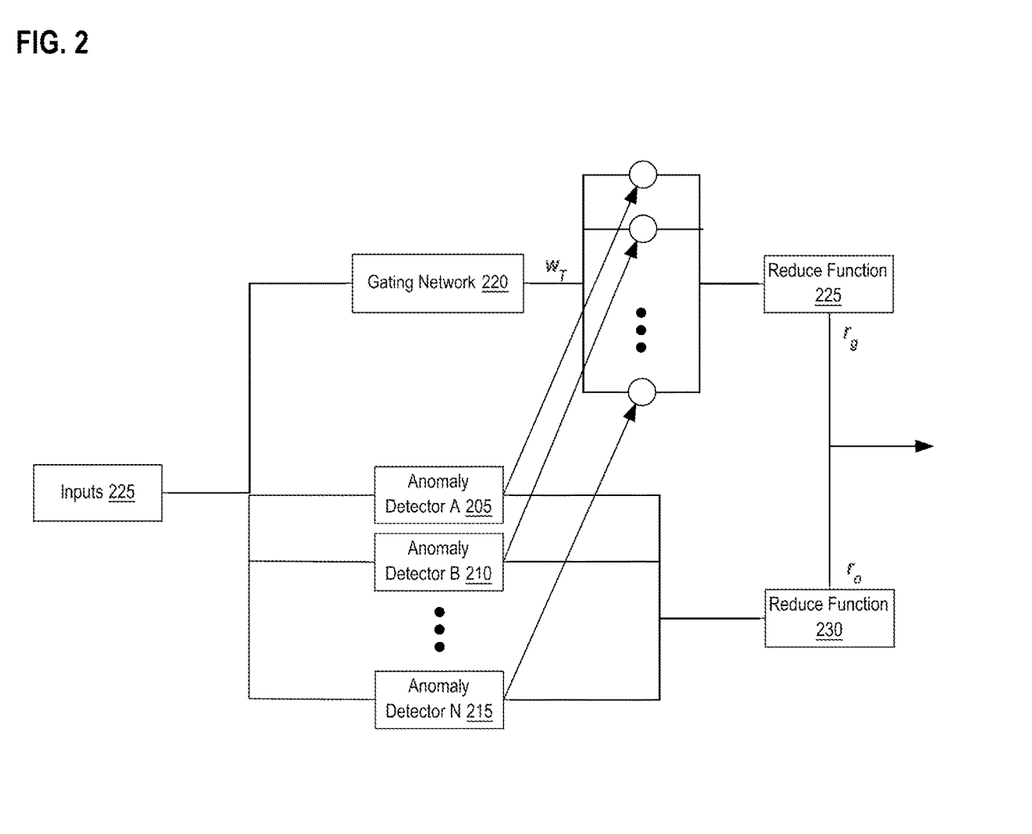
FIG. 2 is a block diagram that depicts an example of training a gating network to select a subset of unsupervised machine learning models, in an embodiment.

FIG. 2 is a block diagram that depicts an example of training a gating network to select a subset of unsupervised models. The discussion below includes details of how components such as anomaly detector A 105, anomaly detector B 110, anomaly detector N 115 of FIG. 1 are used to train the gating network.

Training data comprising a plurality of data samples is used to train gating network. Each data sample of the training data is used as input 225 for anomaly detector A 205, anomaly detector B 210 and anomaly detector N 215. Based on the input 225, anomaly detector A 205, anomaly detector B 210 and anomaly detector N 215 each generate a score of a plurality of scores, wherein each score of the plurality of scores corresponds to a distinct anomaly detector. The plurality of scores is also referred to herein as a vector of original scores.

The same data sample that is used to generate the plurality of scores is used as input 225 to the gating network 220. Based on the input 225, gating network 220 generates a vector of gate weights $\omega_T$ that comprises a plurality of gate weights. Each gate weight of the plurality of gate weights comprises a binary value that corresponds to a distinct anomaly detector.

Each of the gate weights included in vector $\omega_T$ are multiplied against a score from the plurality of scores that corresponds to the same anomaly detector to generate a vector of gated scores that comprises a plurality of gated scores.

A reduce function 225 is applied to the vector of gated scores. Reduce function 225 may comprise a min, max, or average function. As an example, a reduce function applied to the vector of gated scores may, in one embodiment, produce an average of all of the gated scores in the vector. The resulting value of reduce function 225 is represented by the variable $r_g$.

A reduce function 230 is also applied to the vector of original scores. Reduce function 230 may comprise a min, max, or average function. As an example, a reduce function applied to the vector of original scores may, in one embodiment, produce an average of all of the scores in the vector. The resulting value of reduce function 230 is represented by the variable $r_o$.

A loss function for the gating network 220 is applied to calculate an error value for the gating network 220.

In one embodiment, a loss function for the gating network is defined as:

$$L = |r_g - r_o|_2 + \gamma_p l_p + \gamma_s l_s$$

$$\text{where } l_p = |\omega_T|_1 \text{ and } l_s(\omega) = 1 - \frac{(\omega - 0.5)^p}{0.5^p}$$

The loss function includes the value $r_g$ that represents the reduced value of the vector of gated scores. The value $r_o$ represents the reduced value of the vector of original scores. The function $|r_g - r_o|_2$ is referred to as the performance function that measures the performance of the gating network. A value of 0 indicates perfect performance, where a value greater or less than zero indicates less than perfect performance.

The balance between the two parts of the loss function is performed by $\gamma_p$ which is a hyperparameter to be tuned during validation. The higher the value of $\gamma_p$ the sparser the approach becomes and the less accurate the final score is.

Similar to $\gamma_p$, weight factor $\gamma_s$ is also a hyperparameter to be tuned during validation. If the weight factors $\gamma_s$ and $\gamma_p$ are tuned properly, the output values of gates are very close to 0 or 1 and setting them to the boundary values of 0 and 1 does not create any inaccuracies.

In order to push the values includes in the vector of gated scores to be sparse, the penalization function $l_s(\omega)$ is included in the loss function. The penalization function adds cost to the performance function if a gate weight is chosen to be a value between 0 and 1. In one embodiment, the variable p of the penalization function is set to 4.

Once the error value is computed by the loss function, the error value is backpropagated to the gating network 220 and used by the gating network 220 to adjust one or more edge weights of the gating network 220. The training process then repeats using a new data sample from the training data in order to further train and fine tune the gating network 220.

Validation

During validation phase, the trained gating network is fine-tuned using a validation data set. During validation, the trained gating network is used to compute $\omega_T$ as discussed with respect to FIG. 1, and the final outputs are computed similar to training phase. The hyperparameters $\gamma_p$ and $\gamma_s$ are tuned over the validation data set using the trained gating network. The overall performance over the validation data is evaluated from the first part of the loss function: Performance=$|r_g-r_o|_2$. Additionally, the overall performance should be considered in conjunction with the overall achieved sparsity which is defined as the average of $l_p$.

Inference

Figure 3:
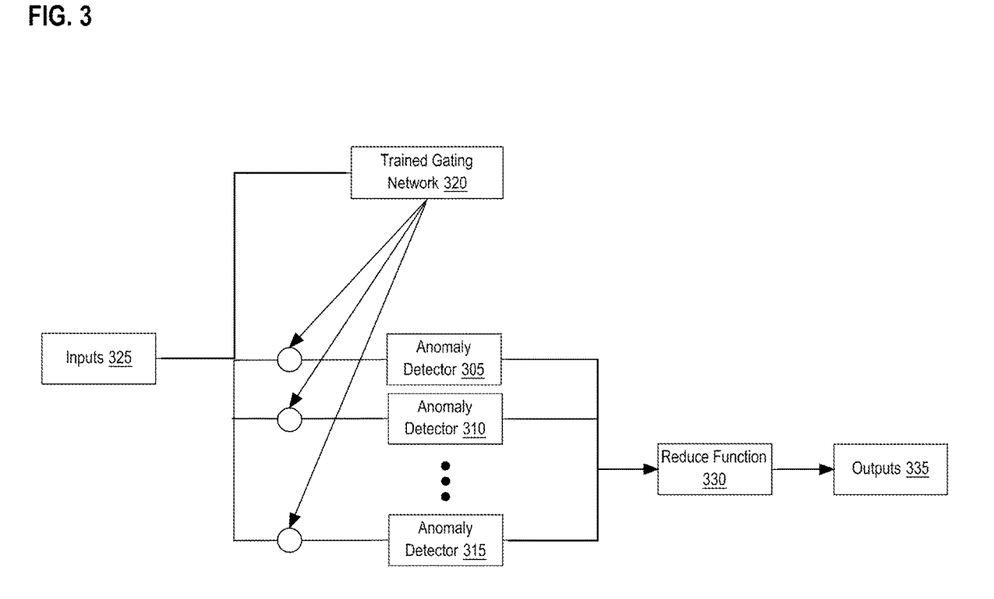
FIG. 3 is a block diagram that depicts an example of the inference phase of sparse ensembling of unsupervised machine learning models, in an embodiment.

FIG. 3 is a block diagram that depicts an example of the inference phase of sparse ensembling of unsupervised machine learning models.

During the inference phase, an inference data set is provided as input 325 to the trained gating network 320 and to a plurality of unsupervised machine learning models such as anomaly detector A 305, anomaly detector B 310 and anomaly detector N 315.

Upon receiving the input 325, trained gating network 320 generates a vector of gate weights as output. The vector of gate weights generated by the trained gating network 320 is used to select a subset of anomaly detectors from anomaly detector A 305, anomaly detector B 310 and anomaly detector N 315 for evaluating the input 325.

For example, if a particular input is used by the trained gating network to generate a vector of gate weights that includes the values {1, 1, 0}, the anomaly detectors that correspond to the gate weights of the vector that are set to '1' are selected to evaluate the particular input.

The selected anomaly detectors each generate a gated score based on the input. The gated scores of the selected anomaly detectors are reduced using a reduce function 330 to generate an ensembled score as output 335. In one embodiment, the reduce function 330 may comprise a min, max, or average function. As an example, a reduce function applied to the gated scores may, in one embodiment, produce an average of all of the gated scores.

Example Sparse Emsembling of Unsupervised Models Procedure

Figure 4:
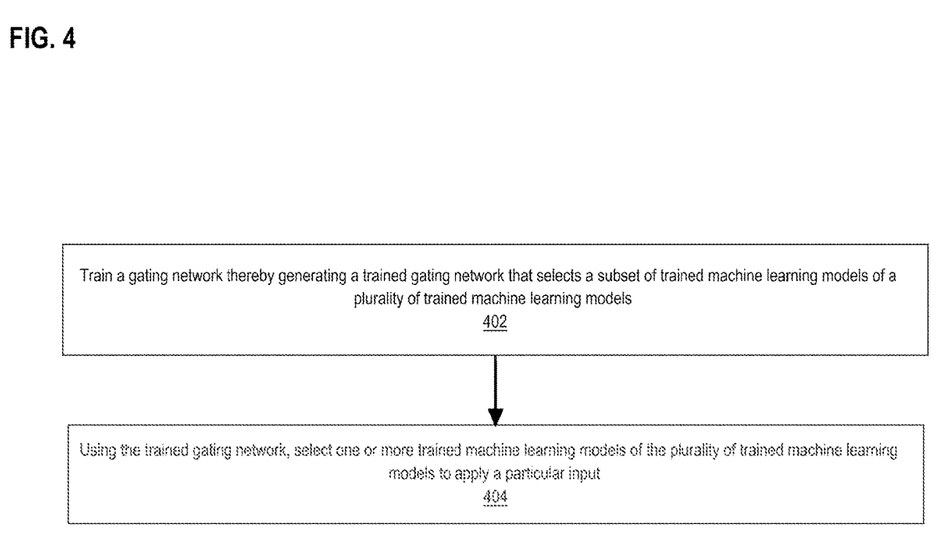
FIG. 4 is a flow diagram for sparse ensembling of unsupervised machine learning models, in an embodiment.

FIG. 4 is a flow diagram for sparse ensembling of unsupervised machine learning models, in an embodiment.

In step 302, a gating network is trained. By training the gating network, a trained gating network is generated that selects a subset of unsupervised machine learning models of a plurality of unsupervised machine learning models.

The gating network is trained in a plurality of training iterations. In each training iteration, a plurality of scores is generated by a distinct unsupervised machine learning model of the plurality of unsupervised machine learning models using a data sample as input. For example, a data sample for the respective training iteration is provided as input to the plurality of unsupervised machine learning models, such as anomaly detector A 105, anomaly detector B 110 and anomaly detector N 115 as shown in FIG. 2. Each unsupervised machine learning model of the plurality of unsupervised machine learning models outputs a score that is based on the data sample.

Additionally, in each training iteration, a plurality of gate weights is generated by the gating network using a data sample as input. Each gate weight of the plurality of gate weights corresponds to a distinct unsupervised machine learning model of the plurality of unsupervised machine learning models. For example, for a given iteration, the same data sample that is provided as input to the plurality of unsupervised machine learning models is provided as input to the gating network. In response, the gating network generates a plurality of gate weights as output. Each gate weight corresponds to a distinct unsupervised machine learning model of the plurality of unsupervised machine learning models. An example of the plurality of gate weights is the vector {1, 1, 0}. Each value in the vector {1, 1, 0} corresponds to a distinct unsupervised machine learning model of the plurality of unsupervised machine learning models.

Furthermore, in each training iteration, a loss function is used to calculate an error value. The error value is based at least in part on the plurality of scores generated by the plurality of unsupervised machine learning models and the plurality of gate weights generated by the gating network in the respective training iteration. Based on the error value, one or more edge weights of the gating network are adjusted to improve the prediction accuracy of the gating network.

In step 304, using the trained gating network, one or more unsupervised machine learning models of the plurality of unsupervised machine learning models are selected to apply a particular input.

Step 304 occurs during the inference phase after the gating network is trained. When the particular input is applied to the trained gating network, an output of gate weights is generated by the trained gating network. Based on the output of gate weights, the one or more unsupervised machine learning models are selected. For example, if the output of gate weights includes the values {1, 1, 0}, the unsupervised machine learning models that correspond to the gate weights of the output that are set to '1' are selected to evaluate the particular input. The unsupervised machine learning models that correspond to the gate weights of the output that are set to '0' are not selected to evaluate the particular input.

The one or more unsupervised machine learning models are used to generate one or more gated scores. For example, each of the one or more unsupervised machine learning models generates a gated score as output based on the particular input. The one or more gated scores are combined using a reduce function thereby generating an ensembled score that represents a combined score of the selected unsupervised machine learning models.

Technical Benefits

The techniques discussed herein provide efficient means for selecting an ensemble of unsupervised machine learning models to evaluate a data sample. The selected ensemble of unsupervised machine learning models provides a subset of unsupervised machine learning models from a larger set of unsupervised machine learning models that produces a final score that matches a final score that is computed using the full set of unsupervised machine learning models. Thus, less unsupervised machine learning models are selected to produce the same results as a full set of unsupervised machine learning models. By executing less unsupervised machine learning models to achieve the same results, numerous computing resources are conserved.

Machine Learning Models

A machine learning model is trained using a particular machine learning algorithm. Once trained, input is applied to the machine learning model to make a prediction, which may also be referred to herein as a predicted output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e., simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., amount of layers) may cause computational latency. Deep learning entails endowing a multilayer perceptron (MLP) with many layers. Each layer achieves data abstraction, with complicated (i.e., multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake a I as an L because those letters have similar features. Correct output may have particular value(s), while actual output may have somewhat different values. The arithmetic or geometric difference between correct and actual outputs may be measured as error according to a loss function, such that zero represents error free (i.e., completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptrons (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e., correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. A machine learning model that is trained using unsupervised training is herein referred to an unsupervised machine learning model. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Deep Context Overview

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g. compound geometry) within an input example. Various techniques have emerged that make deep learning be contextual. One general strategy is contextual encoding, which packs a stimulus input and its context (i.e., surrounding/related details) into a same (e.g. densely) encoded unit that may be applied to an ANN for analysis. One form of contextual encoding is graph embedding, which constructs and prunes (i.e., limits the extent of) a logical graph of (e.g. temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection. For example, an RNN based spelling model may predict that a U follows a Q while reading a word letter by letter. If a letter actually following the Q is not a U as expected, then an anomaly is detected.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g. unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence. Example mathematical formulae and techniques for RNNs and LSTM are taught in related U.S. patent application Ser. No. 15/347,501, entitled "MEMORY CELL UNIT AND RECURRENT NEURAL NETWORK INCLUDING MULTIPLE MEMORY CELL UNITS."

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation. Example mathematical formulae, pseudocode, and techniques for training RNN models using backpropagation through time are taught in related W.I.P.O. patent application No. PCT/US2017/033698, entitled "MEMORY-EFFICIENT BACKPROPAGATION THROUGH TIME".

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 5:
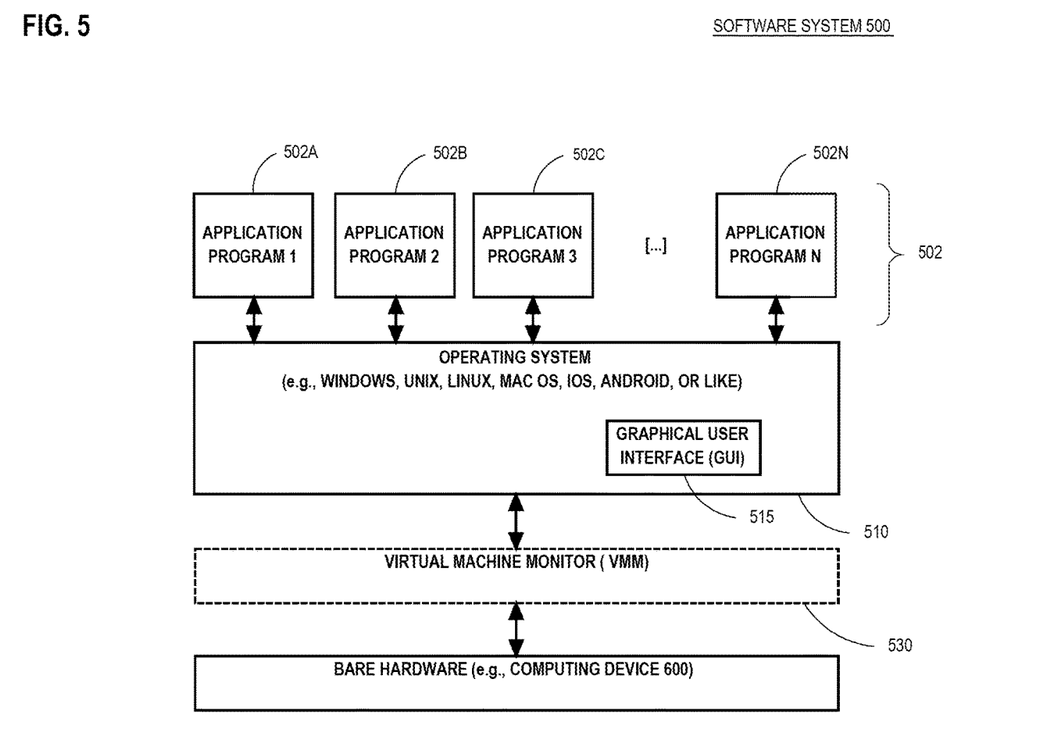
FIG. 5 is a block diagram that illustrates a basic software system that may be employed for controlling the operation of a computing system.

FIG. 5 is a block diagram of a basic software system 500 that may be employed for controlling the operation of computing system 600. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 700. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 505) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
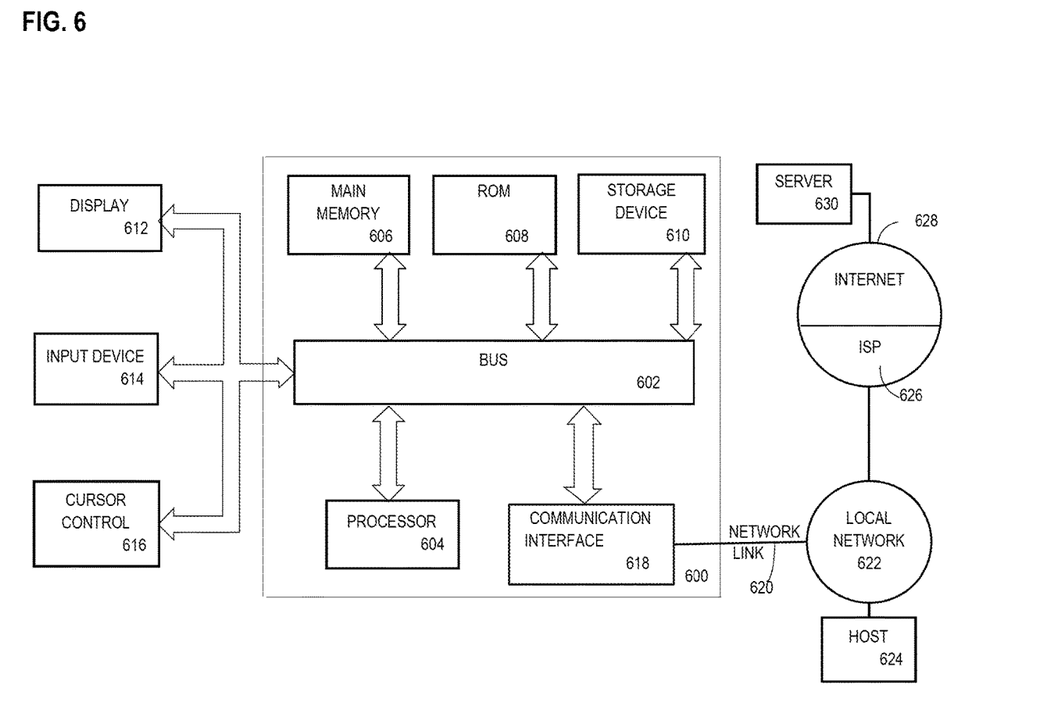
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. A method comprising:
   training a gating network thereby generating a trained gating network that selects a subset of unsupervised machine learning models of a plurality of unsupervised machine learning models; and
   using the trained gating network, selecting one or more unsupervised machine learning models of the plurality of unsupervised machine learning models to apply a particular input;
   wherein selecting the one or more unsupervised machine learning models comprises:
      applying the trained gating network to the particular input to generate an output of gate weights, and
      selecting the one or more unsupervised machine learning models based on the output of gate weights.

2. The method of claim 1, wherein training the gating network comprises:
   generating a plurality of scores, each score of the plurality of scores generated by a distinct unsupervised machine learning model of the plurality of unsupervised machine learning models using a data sample as input;
   generating a plurality of gate weights, each gate weight of the plurality of gate weights generated by the gating network using the data sample as input, each gate weight of the plurality of gate weights corresponding to a distinct unsupervised machine learning model of the plurality of unsupervised machine learning models.

3. The method of claim 2, further comprising:
   using a loss function, calculating an error value based at least in part on the plurality of scores and the plurality of gate weights;
   adjusting one or more edge weights of the gating network based on the error value.

4. The method of claim 3, wherein the loss function comprises a performance function that measures performance of the gating network and a penalization function that adds cost to the performance function if a gate weight is between 0 and 1.

5. The method of claim 1, wherein each unsupervised machine learning model of the plurality of unsupervised machine learning models is configured to generate a score that indicates how anomalous an input is.

6. The method of claim 1, wherein each unsupervised machine learning model of the plurality of unsupervised machine learning models comprises a trained machine learning model that is trained using unsupervised learning.

7. The method of claim 1, wherein each unsupervised machine learning model of the plurality of unsupervised machine learning models comprises an anomaly detector.

8. The method of claim 1, wherein each gate weight of the gate weights comprises a binary value.

9. The method of claim 1, wherein the trained gating network comprises a feed-forward neural network.

10. The method of claim 1, further comprising:
    generating one or more gated scores based on the one or more unsupervised machine learning models;
    combining the one or more gated scores using a reduce function thereby generating an ensembled score.

11. A non-transitory computer-readable storage medium storing sequences of instructions that, when executed by one or more processors, cause:
    training a gating network thereby generating a trained gating network that selects a subset of unsupervised machine learning models of a plurality of unsupervised machine learning models; and
    using the trained gating network, selecting one or more unsupervised machine learning models of the plurality of unsupervised machine learning models to apply a particular input;
    wherein selecting the one or more unsupervised machine learning models comprises:
       applying the trained gating network to the particular input to generate an output of gate weights, and
       selecting the one or more unsupervised machine learning models based on the output of gate weights.

12. The non-transitory computer-readable storage medium of claim 11, wherein training the gating network comprises:
    generating a plurality of scores, each score of the plurality of scores generated by a distinct unsupervised machine learning model of the plurality of unsupervised machine learning models using a data sample as input;
    generating a plurality of gate weights, each gate weight of the plurality of gate weights generated by the gating network using the data sample as input, each gate weight of the plurality of gate weights corresponding to a distinct unsupervised machine learning model of the plurality of unsupervised machine learning models.

13. The non-transitory computer-readable storage medium of claim 12, wherein training the gating network comprises:
    using a loss function, calculating an error value based at least in part on the plurality of scores and the plurality of gate weights;
    adjusting one or more edge weights of the gating network based on the error value.

14. The non-transitory computer-readable storage medium of claim 13, wherein the loss function comprises a performance function that measures performance of the gating network and a penalization function that adds cost to the performance function if a gate weight is between 0 and 1.

15. The non-transitory computer-readable storage medium of claim 11, wherein each unsupervised machine learning model of the plurality of unsupervised machine learning models is configured to generate a score that indicates how anomalous an input is.

16. The non-transitory computer-readable storage medium of claim 11, wherein each unsupervised machine learning model of the plurality of unsupervised machine learning models comprises a trained machine learning model that is trained using unsupervised learning.

17. The non-transitory computer-readable storage medium of claim 11, wherein each unsupervised machine learning model of the plurality of unsupervised machine learning models comprises an anomaly detector.

18. The non-transitory computer-readable storage medium of claim 11, wherein each gate weight of the gate weights comprises a binary value.

19. The non-transitory computer-readable storage medium of claim 11, wherein the trained gating network comprises a feed-forward neural network.

20. The non-transitory computer-readable storage medium of claim 11, the sequences of instructions including instructions that, when executed by said one or more processors, cause:
    generating one or more gated scores based on the one or more unsupervised machine learning models;
    combining the one or more gated scores using a reduce function thereby generating an ensembled score.

* * * * *